United States Patent
Lee et al.

(10) Patent No.: US 9,053,857 B2
(45) Date of Patent: Jun. 9, 2015

(54) NICKEL NANOPARTICLE, METHOD OF PREPARING THE SAME, AND MULTILAYER CERAMIC CAPACITOR USING THE SAME

(75) Inventors: Ro Woon Lee, Gyunggi-do (KR); Jae Man Park, Gyunggi-do (KR); Sung Koo Kang, Gyunggi-do (KR); Yoon Hee Lee, Gyunggi-do (KR); Young Ho Kim, Gyunggi-do (KR)

(73) Assignee: SAMSUNG ELECTRO-MECHANICS CO., LTD., Suwon, Gyunggi-Do (KR)

(*) Notice: Subject to any disclaimer, the term of this patent is extended or adjusted under 35 U.S.C. 154(b) by 82 days.

(21) Appl. No.: 13/585,024

(22) Filed: Aug. 14, 2012

(65) Prior Publication Data

US 2013/0321976 A1    Dec. 5, 2013

(30) Foreign Application Priority Data

Jun. 5, 2012  (KR) .................. 10-2012-0060186

(51) Int. Cl.
*H01B 1/02* (2006.01)
*H01B 1/22* (2006.01)
*H01G 4/008* (2006.01)

(52) U.S. Cl.
CPC ........... *H01G 4/008* (2013.01); *Y10T 428/2982* (2013.01)

(58) Field of Classification Search
CPC .......... H01G 4/30; H01G 4/005; H01G 4/008
USPC ........................... 252/513, 521.2; 75/255, 351
See application file for complete search history.

(56) References Cited

U.S. PATENT DOCUMENTS

| 2005/0072270 A1* | 4/2005 | Kato et al. ...................... 75/255 |
| 2006/0289838 A1 | 12/2006 | Yoon et al. |
| 2009/0014694 A1* | 1/2009 | Mukuno et al. ............... 252/513 |

FOREIGN PATENT DOCUMENTS

| JP | 2004-330247 A | 11/2004 |
| JP | 2006-152439 A | 6/2006 |
| JP | 2008-505252 A | 2/2008 |
| JP | 2011-084762 A | 4/2011 |
| JP | 2011-149080 A | 8/2011 |
| KR | 10-2007-0101091 A | 10/2007 |
| KR | 10-2010-0123359 A | 11/2010 |
| WO | 2006-132643 A2 | 12/2006 |

OTHER PUBLICATIONS

Korean Office Action dated Nov. 26, 2014 issued in Korean Patent Application No. 10-2012-0060186 (English translation).
Japanese Office Action issued in corresponding Japanese Patent Application No. 2012-176757 issue on Sep. 30, 2014.

* cited by examiner

*Primary Examiner* — Khanh Tuan Nguyen
(74) *Attorney, Agent, or Firm* — McDermott Will & Emery LLP

(57) ABSTRACT

There is provided a method of preparing a nickel nanoparticle, the method including: forming an aqueous solution by mixing water and a solution containing a hydroxyl group; forming a mixed liquid by adding carboxylic acid to the aqueous solution at a ratio of 10 to 20 wt % with regard to the solution containing a hydroxyl group; and adding a nickel salt to the mixed liquid and stirring the mixed liquid.

6 Claims, 4 Drawing Sheets

A-A'

NICKEL NANOPARTICLE, METHOD OF PREPARING THE SAME, AND MULTILAYER CERAMIC CAPACITOR USING THE SAME

CROSS-REFERENCE TO RELATED APPLICATIONS

This application claims the priority of Korean Patent Application No. 10-2012-0060186 filed on Jun. 5, 2012, in the Korean Intellectual Property Office, the disclosure of which is incorporated herein by reference.

BACKGROUND OF THE INVENTION

1. Field of the Invention

The present invention relates to a nickel nanoparticle, a method of preparing the same, and a multilayer ceramic capacitor using the same.

2. Description of the Related Art

As electronic parts using a ceramic material, there may be provided a capacitor, an inductor, a piezoelectric element, a varistor, a thermistor, and the like.

Among these, a multilayer ceramic capacitor (MLCC) is a chip type condenser, mounted on circuit boards of a wide range of electronic products to perform important roles of blocking direct current and passing an alternative current therethrough, and being charged with or discharging electricity.

Besides, the multilayer ceramic capacitor is used in functions such as signal bypass, frequency resonance, and the like. The multilayer ceramic capacitor may be advantageous in that it has a small change in dielectric constant according to temperature, has a small size and a high capacitance, and has ease of mountability.

Recently, as an electronic product, such as a computer, a personal digital assistant (PDA), a cellular phone, or the like has been reduced in size, a multilayer ceramic capacitor used in this electronic product is also required to be low in weight, have an ultrasmall size, and have ultrahigh capacitance.

To allow for the ultra small size and ultra high capacitance of the multilayer ceramic capacitor, technologies for ultra thinning and high dispersion of a dielectric layer and an internal electrode constituting the multilayer ceramic capacitor need to take precedence.

In addition, for these technologies for ultra thinning and high dispersion, characteristics of a metal which is a raw material of an internal electrode are important. Hence, it is important to prepare metal nanoparticles having excellent particle size distribution through a Brunauer-Emmett-Teller (BET) method.

Meanwhile, in the related art, a noble metal such as silver, platinum, palladium, or the like, having excellent conductivity, was used as the raw metal, but this metal has recently been replaced by nickel in view of reducing manufacturing costs.

However, since nickel has a lower packing density than a molded body thereof in powder metallurgy, and the shrinkage amount of internal electrodes due to sintering at the time of firing is large as compared with that of dielectric layers, an interlayer short-circuit or disconnection may be easily generated between the internal electrodes.

In order to prevent occurrences thereof, nickel powder needs to have a uniform particle size distribution and excellent dispersibility without agglomerations thereof.

However, the respective nickel nanoparticles may agglomerate during dispersion thereof.

In order to solve this defect, agglomeration between particles due to activation was partially improved by preparing several tens to several hundreds of nanoparticles through a drying or wetting method, forming an artificial oxidation film thereon through a simple heat treatment, and inducing an inactive state therein.

However, this heat treatment may cause a large change in dispersion characteristics due to non-uniform oxidation. Further, after heat treatment, NiO, Ni(OH)$_2$ or CO, and the like, which are inactive, are co-present rather, so that, due to surface non-uniformities thereof, dispersibility may be further deteriorated or agglomeration between particles may be further increased, and thus, there are limits to solving the agglomeration defect of nickel particles.

Particularly, in a Ni—OH structure, difficulties are caused in terms of chemisorption with a dispersant, due to deteriorated acidity of nickel. Here, even when chemisorption with a dispersant occurs, this is highly likely to be dehydration binding of water molecules. If the water molecule is dissociated, the water molecule is adsorbed on polar portions of the resin and the dispersant, so that the function of the dispersant may be deteriorated and the resin may be agglomerated, resulting in deteriorating dispersibility of a paste.

Patent Document 1, the following related art document, does not disclose that 10 to 20 wt % of carboxylic acid is mixed with nickel nanoparticles.

(Patent Document 1) Japanese Patent Laid-Open Publication No. 2006-152439

SUMMARY OF THE INVENTION

In the art, a new method of fabricating nickel nanoparticles, suppressing agglomeration between the nickel nanoparticles through performing a surface treatment thereon, and allowing a functional group of a dispersant to adhere surfaces thereof, has been requested.

According to an aspect of the present invention, there is provided a method of preparing a nickel nanoparticle, the method including: forming an aqueous solution by mixing water and a solution containing a hydroxyl group; forming a mixed liquid by adding carboxylic acid to the aqueous solution at a ratio of 10 to 20 wt % with regard to the solution containing a hydroxyl group; and adding a nickel salt to the mixed liquid and stirring the mixed liquid.

The method may further include, after the stirring of the mixed liquid, drying and heat treating the mixed liquid.

Here, in the forming of the aqueous solution, the solution containing a hydroxyl group may be mixed at a ratio of 10 to 100 wt %, with regard to the water.

Here, in the forming of the aqueous solution, hydrogen peroxide (H$_2$O$_2$) and chlorine dioxide (ClO$_2$) may be used for the solution containing a hydroxyl group.

The drying of the mixed liquid may be performed under a nitrogen atmosphere at a temperature of 80 to 100° C.

The heat treating may be performed under an air atmosphere at a temperature of 180 to 250° C.

According to another aspect of the present invention, there is provided a nickel nanoparticle comprising 20.0 to 60.0 at % of NiO; 20.0 to 60.0 at % of Ni(OH)$_2$; and 0.5 to 20.0 at of CO.

The nickel nanoparticle may have an average particle diameter of 60 to 500 nm.

According to another aspect of the present invention, there is provided a multilayer ceramic capacitor, including: a ceramic body having a plurality of dielectric layers laminated therein; a plurality of first and second internal electrodes respectively formed on at least one surface of each of the plurality of dielectric layers, disposed within the ceramic body, and including 20.0 to 60.0 at % of NiO; 20.0 to 60.0 at % of Ni(OH)2; and 0.5 to 20.0 at of CO; and first and second external electrodes formed on both end surfaces of the ceramic body and electrically connected to exposed portions of the first and second internal electrodes.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
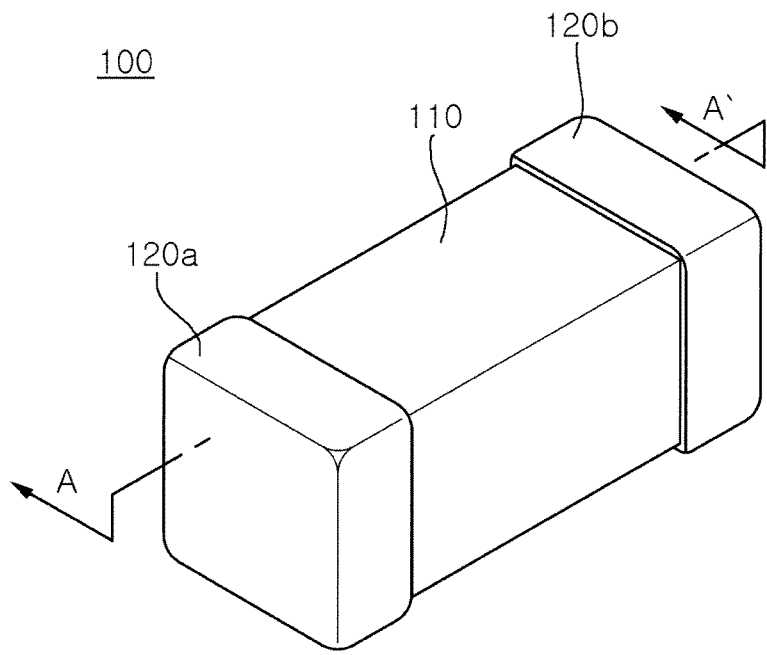
FIG. 1 is a schematic perspective view of a multilayer ceramic capacitor including, as a material for an internal electrode, nickel nanoparticles fabricated according to an embodiment of the present invention.

Hereinafter, embodiments of the present invention will be described in detail with reference to the accompanying drawings to allow the present invention to be easily practiced by those skilled in the art to which the present invention pertains.

The embodiments of the present invention may be modified in many different forms and the scope of the invention should not be seen as being limited to the embodiments set forth herein.

Rather, these embodiments are provided so that this disclosure will be thorough and complete, and will fully convey the concept of the invention to those skilled in the art.

In the drawings, the shapes and dimensions of elements may be exaggerated for clarity, and the same reference numerals will be used throughout to designate the same or like components.

In addition, like reference numerals denote parts performing similar functions and actions throughout the drawings.

In addition, unless explicitly described otherwise, "comprising" any components will be understood to imply the inclusion of other components but not the exclusion of any other components.

Hereinafter, a method of preparing a nickel nanoparticle according to an embodiment of the present invention and a nickel nanoparticle prepared by the method will be described in detail.

A nickel nanoparticle according to an embodiment of the present invention may be prepared by forming an aqueous solution by mixing water and a solution containing a hydroxyl group (OH group); forming a mixed liquid by adding carboxylic acid to the aqueous solution at a ratio of 10 to 20 wt % with regard to the solution containing a hydroxyl group; and adding a nickel salt to the mixed liquid and stirring the mixed liquid.

After that, the mixed liquid which has been stirred is dried and subjected to heat treatment, to thereby prepare a nickel nanoparticle used in a paste for an internal electrode.

The technical feature of the present invention is to add carboxylic acid to the solution containing a hydroxyl group in a ratio of 10 to 20 wt % with regard to the solution containing a hydroxyl group, and performing reduction thereon. Hence, through this process, a nickel nanoparticle having excellent dispersion stability may be prepared.

The preparation method of a nickel nanoparticle according to the embodiment will be described according to the operations.

Figure 3:
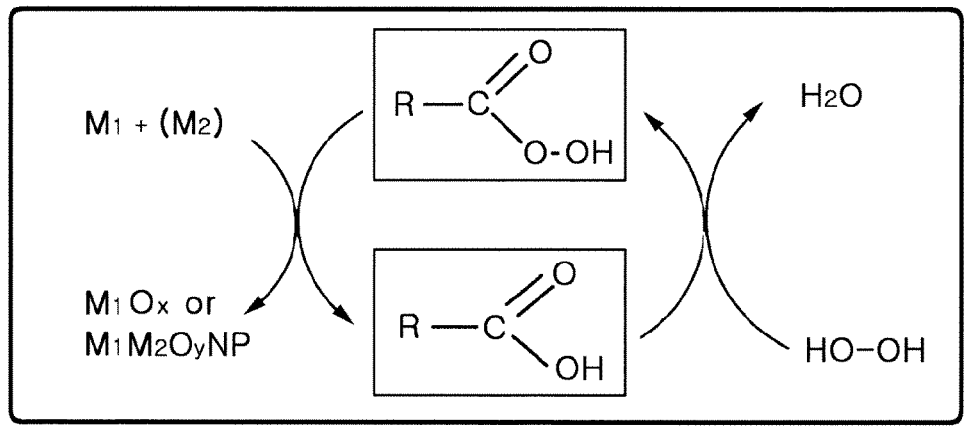
FIG. 3 is a diagram illustrating a reaction mechanism of a solution containing a hydroxyl group and carboxylic acid in a nickel nanoparticle.

FIG. 3 is a diagram illustrating a reaction mechanism of a solution containing a hydroxyl group and carboxylic acid in the nickel nanoparticle prepared according to an embodiment of the present invention.

Referring to FIG. 3, first, an aqueous solution is formed by mixing water ($H_2O$), distilled water and a solution containing a hydroxyl group.

Here, the hydroxyl group is a monovalent group represented by —OH, and referred to as a "hydroxyl group" in the case of an organic material.

Examples of an inorganic compound containing the hydroxyl group may include hydroxides of metal, for example, sodium hydroxide (NaOH), aluminum hydroxide ($Al(OH)_3$), and further include oxygen acid such as nitric acid, sulfuric acid, or the like, and a hydroxy salt, a kind of basic salt.

In addition, examples of an organic compound containing the hydroxyl group may include alcohols such as ethanol and the like, and sulphonic acids such as benzensulfonic acid and the like.

In the embodiment, hydrogen peroxide ($H_2O_2$) and chlorine dioxide ($ClO_2$) are used as the solution containing a hydroxyl group, but the present invention is not limited thereto.

The solution containing a hydroxyl group may be mixed with water at a ratio of preferably 10 to 100 wt % with regard to water, and for example, a ratio of $NiO:Ni(OH)_2:CO$ may be changed from 1:5:4 to 3:6.5:0.5, so that an oxidation film may be formed through a reaction between the solution containing a hydroxyl group and carboxylic acid to be described below.

If the ratio of the solution containing a hydroxyl group mixed with water is below 10 wt % with regard to water, an oxidation reaction of the solution containing a hydroxyl group and carboxylic acid does not occur, and thus, a change in the content of NiO is not generated. Therefore, the oxidation film is improperly formed.

In addition, if the ratio of the solution containing a hydroxyl group mixed with water is above 100 wt % with regard to water, the ratio of $NiO:Ni(OH)_2:CO$ may be changed from 1:5:4 to 0.2:8.8:1, so that the content of OH groups in the particle may be increased due to surplus hydroxyl groups.

Then, the mixed liquid is formed by adding carboxylic acid to the aqueous solution at a ratio of 10 to 20 wt % with regard to the solution containing a hydroxyl group.

The carboxylic acid may easily react with the hydroxyl group when the ratio of carboxylic acid mixed with the aqueous solution is 10 to 20 wt % with regard to the solution containing a hydroxyl group. If the ratio of the carboxylic acid is below 10 wt %, an oxidation reaction between particles may not occur. If the carboxylic acid is above 20 wt %, for example, the ratio of $NiO:Ni(OH)_2:CO$ may be changed from 1:5:4 to 3:5:2, so that the content of CO in the particle may be increased due to surplus carboxylic acid.

Carboxylic acid includes a carbon atom and an oxygen atom double-bonded, and denotes a compound in which a hydroxyl group is single-bonded, and there may be, for example, acetic acid, ester, or the like.

The adding of carboxylic acid to the aqueous solution may accelerate oxidizing melting of the nickel nanoparticle. Through the reaction in which the solution containing a hydroxyl group as a solvent and carboxylic acid as weak acid are mixed with each other, a surface of the nanoparticle may be finely etched and at the same time, an oxidation film may be uniformly formed thereon to improve colloidal stability.

That is, through this reaction, the surface of the nanoparticle is formed such that a dispersant may more smoothly be adsorbed thereon, as compared with a case before performing a surface treatment, and thus, dispersion stability of the nickel nanoparticle can be improved.

Then, a nickel salt is added to the mixed liquid of the solution containing a hydroxyl group and carboxylic acid, and then the mixed liquid is stirred.

As methods of adding the nickel salt to the mixed liquid and performing stirring, there are provided a drying method and a wetting method. The drying method is a physical method, and, there may be, for example, a method of mechanically grinding a bulk with high energy to reduce the bulk to particles on the nanometer level, or a method of melting a target material through the application of a large amount of energy, such as heat or an electron beam, thereto, and then evaporating and condensing the material to thereby obtain a powder having a size of 100 nm or less. As for the wetting method, a nucleus may be generated by using a chemical reaction, and then grown to a desired size, to prepare a nano-powder.

Here, the nickel salt is a compound containing a nickel ion, and examples thereof may include $NiCl_2$, $Ni(NO_3)_2$, $NiSO_4$, $(CH_3COO)_2Ni$, and the like, and the present invention is not limited thereto.

Then, the mixed liquid which has been stirred is dried, and then the nanoparticle is subjected to heat treatment, thereby finally obtaining a nickel nanoparticle usable in a paste for an internal electrode.

The drying process may be performed under a nitrogen atmosphere at a temperature of preferably 80 to 100° C., and in this case, the nickel particle may be properly dried in a powder state.

If the temperature is below 80° C. during the drying process, moisture may not be effectively removed. If the temperature is above 100° C., organic matter may not be removed, due to an occurrence of non-uniform oxidation or the color of nickel powder may be changed due to a generation of a second oxidation layer.

The heat treatment process may preferably be performed under an air atmosphere at a temperature of 180 to 250° C., and here, the ratio of $NiO:Ni(OH)_2:CO$ may be changed to 4:6.5:0.5.

If the temperature during the heat treatment is below 180° C., the content of OH is not changed, leading to occurrence of residual carbon due to the presence of organic matter. If the temperature is above 250° C., the content of CO is increased, and thus, the removal of second organic matter and necking between particles are may be caused.

The nickel nanoparticle prepared as above may preferably contain 20.0 to 60.0 at % of NiO; 20.0 to 60.0 at % of $Ni(OH)_2$; and 0.5 to 20.0 at % of CO.

Here, NiO may have a significantly increased nickel shrinkage control effect at the time of a high-temperature firing process when NiO is contained in the content of 20.0 to 60.0 at %. If the content is below 20.0 at %, the contents of $Ni(OH)_2$ and CO are relatively increased, and thus, dispersion and residual carbon may be generated. If the content is above 60.0 at %, the content of pure nickel is reduced due to excessive oxides, and thus electric characteristics may be deteriorated.

In addition, when the content of $Ni(OH)_2$ is 20.0 to 60.0 at %, $Ni(OH)_2$ may be easily removed and changed to an oxidation layer at the time of a calcining process, and thus, shrinkage control may be favorable. If the content is below 20.0 at %, the increased amount of CO is relatively greater as compared with the decreased amount of OH, and thus, residual carbon may occur. If the content is above 60.0 at %, $H_2O$ is generated after adsorption of a dispersant, and thus, time-dependent changes of a paste may occur.

In addition, in the content of CO in the range of 0.5 to 20.0 at %, residual carbon may be removed at the time of calcining and firing processes, and the nickel shrinkage control effect due to an oxide increase may be significantly increased. If the content is below 0.5 at %, the amount of an OH group is relatively increased, and thus, the dispersion characteristics and time-dependent changes of the paste may occur. If the content is above 20.0 at %, residual carbon may occur in the calcining and firing processes.

In order to confirm characteristics of the nickel nanoparticle prepared by the method according to an embodiment of the present invention, analysis was performed by using X-ray photoelectron spectroscopy (XPS), X-ray diffraction (XRD), and transmission electron microscope (TEM) before and after the surface treatment of the particle, and changes in surface characteristics of the nickel nanoparticle are confirmed thereby.

Figure 4:
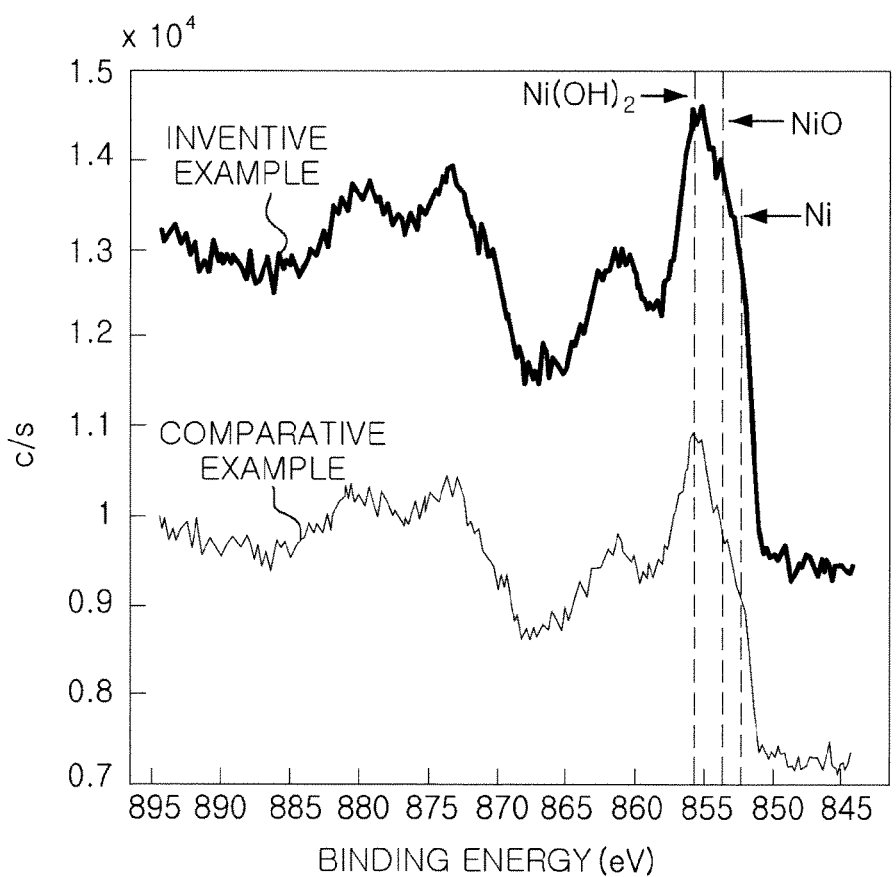
FIG. 4 is a graph illustrating the contents of Ni $(OH)_2$ and NiO contained in a nickel nanoparticle according to whether or not a surface treatment is performed, in a qualitative peak form, by analyzing the nickel nanoparticle using X-ray photoelectron spectroscopy (XPS)

FIG. 4 is a graph illustrating the contents of $Ni(OH)_2$ and NiO contained in the nickel nanoparticle in a qualitative peak form by analyzing the nickel nanoparticle using X-ray photoelectron spectroscopy (XPS).

In FIG. 4, comparative example shows analysis results of the nickel nanoparticle before performing a surface treatment and inventive example shows analysis results of the nickel nanoparticle surface-treated according to the present embodiment.

Referring to FIG. 4, peak shapes of $Ni(OH)_2$ and NiO in binding energy are largely changed in the inventive example in which a surface of the nickel nanoparticle is finely etched and then a uniform oxidation film is formed thereon, as compared with the comparative example in which a surface treatment is not performed. Therefore, it can be seen that components of nickel nanoparticle surface-treated according to the present embodiment are changed.

Table 1 below shows changes in component contents of the nickel nanoparticle depending on whether or not a surface treatment is performed as shown in FIG. 4, according to the inventive example and the comparative example.

TABLE 1

| Classification | NiO (at %) | $Ni(OH)_2$ (at %) | CO (at %) |
| --- | --- | --- | --- |
| Comparative Example | 11.77 | 59.26 | 28.97 |
| Inventive Example | 22.20 | 68.83 | 8.96 |

<XPS Analysis Results of Nickel Nanoparticle Depending on Whether or not Surface Treatment is Performed Thereupon>

Since a surface of nickel powder may be mostly present in a state of NiO, Ni (OH)$_2$ and CO, it can be confirmed from Table 1 above that component contents of NiO, Ni(OH)$_2$, and CO are changed depending on whether or not a surface treatment is performed on the nickel nanoparticle.

It can be seen that, when the surface of the nickel nanoparticle was treated as described in the inventive example, the content of NiO was increased from 11.77 at (comparative example) to 22.20 at (inventive example), and thus, adsorption of the dispersant was more facilitated.

In addition, the content of Ni(OH)$_2$ was slightly increased from 59.26 at % (comparative example) to 68.83 at % (inventive example), but Ni(OH)$_2$ whose content has been increased may be removed through a subsequent heat treatment.

In addition, CO of the nickel nanoparticle inappropriately affects electric characteristics of a multilayer ceramic capacitor when it is used as a material for internal electrodes of the multilayer ceramic capacitor. The content of CO is largely decreased from 28.97 at % (comparative example) to 8.96 at % (inventive example), and thus, it can be seen that a nickel nanoparticle having excellent characteristics may be fabricated through the surface treatment according to the present embodiment.

Figure 5A:
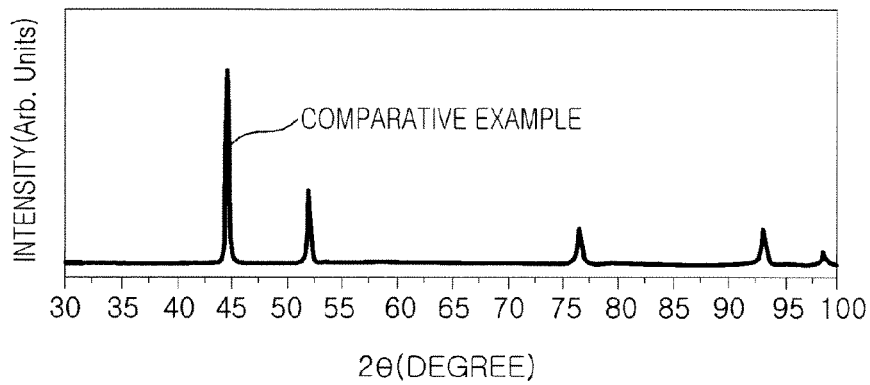
FIGS. 5A and 5B are graphs respectively illustrating X-ray diffraction (XRD) analysis results of a nickel nanoparticle prepared according to the related art and the nickel nanoparticle surface-treated according to the embodiment of the present invention.
Figure 5B:
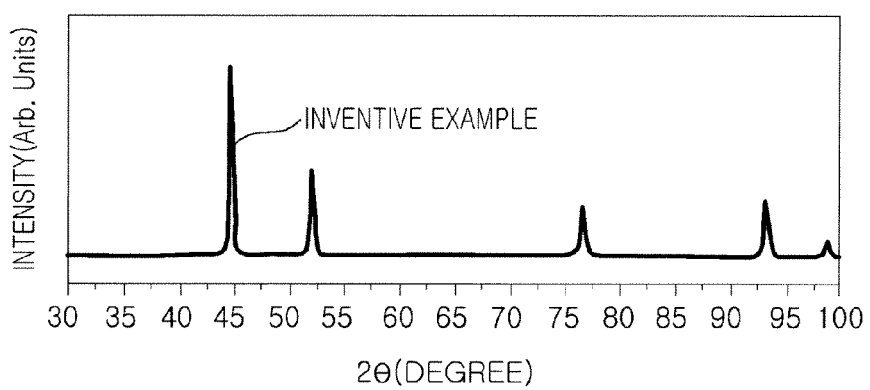

FIGS. 5A and 5B are graphs respectively illustrating X-ray diffraction (XRD) analysis results of a nickel nanoparticle prepared according to the related art and the nickel nanoparticle surface-treated according to the embodiment of the present invention.

Figure 5C:
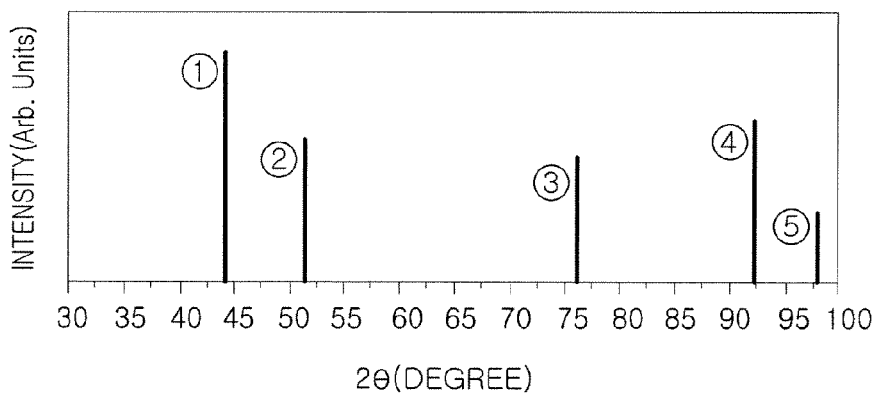
FIG. 5C is a graph illustrating an X-ray diffraction (XRD) value of a general nickel nanoparticle.

FIG. 5C is a graph illustrating an X-ray diffraction value (XRD) of a general nickel nanoparticle, and intensities of the nickel nanoparticle according to the azimuth angles were shown by using peak values at ① 111 degrees, ② 200 degrees, ③ 220 degrees, ④ 311 degrees, and ⑤ 222 degrees, respectively.

When the intensities of the nickel nanoparticles at the corresponding azimuth angles in FIG. 5C, and FIG. 5A before performing a surface treatment and FIG. 5B after performing a surface treatment, according to the present embodiment, are compared with each other, it can be confirmed that the comparative examples show values the same as those of the general nickel nanoparticle, and intensity values at the corresponding azimuth angles in the comparative example and the inventive example are practically the same as those of the general nickel nanoparticle.

Therefore, it can be seen that a nickel oxide, except for a nickel crystal having a cubic (FCC) structure, was not co-present in the nickel nanoparticle surface-treated according to the present embodiment. This means that only an oxidation layer on the surface of the nickel nanoparticle was changed due to the surface treatment without changes in a crystal structure.

Figure 6:
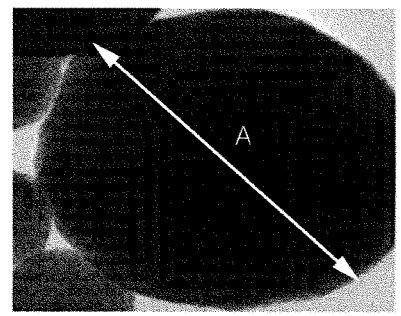
FIG. 6 is a scanning electron microscope (SEM) image of the nickel nanoparticle prepared according to an embodiment of the present invention.
Figure 7:
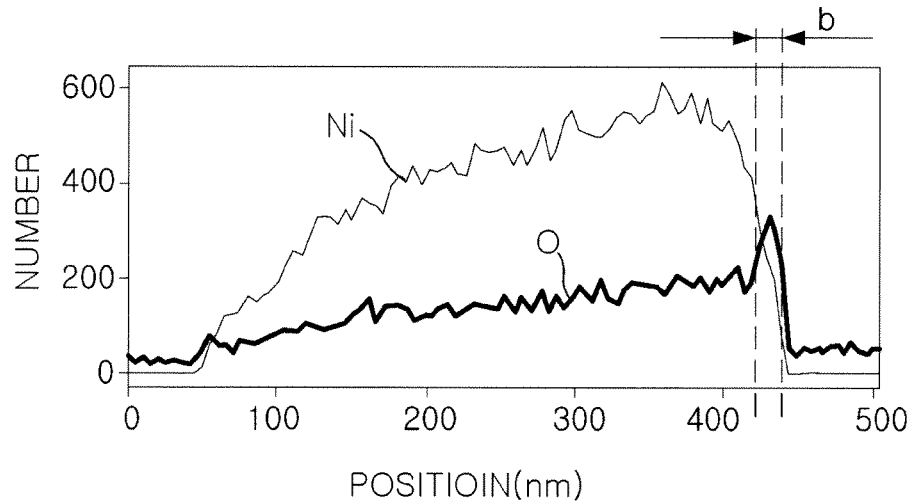
FIG. 7 is a graph illustrating changes in nickel (Ni) and oxygen (O) at a specific position, which are obtained by scanning Section A of the nickel nanoparticle, shown in FIG. 6, using a transmission electron microscope (TEM).

FIG. 6 is a scanning electron microscope (SEM) image of the nickel nanoparticle prepared according to an embodiment of the present invention; and FIG. 7 is a graph illustrating changes in nickel (Ni) and oxygen (O) at a specific position, which are obtained by scanning Section A of the nickel nanoparticle, shown in FIG. 6, using a transmission electron microscope (TEM).

Referring to FIG. 6 and FIG. 7, when components of the particle were scanned, there was a section (b) in which the content of Ni was decreased while the content of O was increased. Considering that the section (b) is present at an edge portion on the position, it can be confirmed that the surface of the nickel nanoparticle was treated to form an oxidation layer.

According to the embodiment, the nickel nanoparticle after performing a surface treatment is spherical, narrow, and uniform, and it has an average particle diameter of 60 to 500 nm, and has excellent dispersion stability.

As described above, according to the present embodiment, it can be seen that, as a result of performing the surface treatment of the nickel nanoparticle by using a solvent containing carboxylic acid and a hydroxyl group, the component and the shape of the oxide formed on the surface of the particle are changed.

This change leads to an increase in adsorbability of a dispersant due to the increase in the content of an NIO oxide layer, to thereby improve dispersibility of the paste, whereby surface roughness of the nickel nanoparticle may be improved and time-dependent changes may be decreased.

In addition, according to the method of preparing a nickel nanoparticle of the present embodiment, when a multilayer ceramic capacitor is manufactured by using the nickel nanoparticle in which the content of CO has been reduced, the residual carbon within the chip is reduced and a dielectric effect is significantly reduced, so that a multilayer ceramic capacitor having improved reliability can be manufactured.

Figure 2:
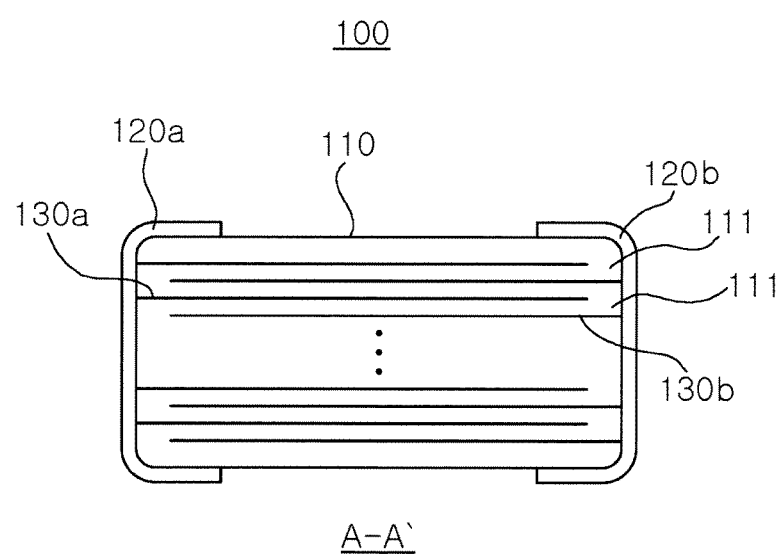
FIG. 2 is a cross-sectional view taken along line A-A' of FIG. 1.

Referring to FIGS. 1 and 2, a multilayer ceramic capacitor 100 according to the present embodiment may include a ceramic body 110 having a plurality of dielectric layers 111 laminated therein; a plurality of first and second internal electrodes 130a and 130b respectively formed on at least one surface of each of the plurality of dielectric layers 111 and disposed within the ceramic body 110; and first and second external electrodes 120a and 120b formed on both end surfaces of the ceramic body 110 and electrically connected to exposed portions of the first and second internal electrodes 130a and 130b to serve as external terminals.

Here, the first and second internal electrodes 130a and 130b may be formed by using a conductive paste containing the above-described nickel nanoparticle of the present embodiment.

According to the embodiment of the present invention, the surface treatment of the nickel nanoparticles is performed, thereby suppressing agglomeration among particles and making the nickel nanoparticle have a surface to which a functional group of the dispersant can appropriately adhere, and thus, when this nickel nanoparticle is used to prepare a paste for an internal electrode, dispersion stability can be improved and the time-dependent change problems can be solved.

While the present invention has been shown and described in connection with the embodiments, it will be apparent to those skilled in the art that modifications and variations can be made without departing from the spirit and scope of the invention as defined by the appended claims.

What is claimed is:

1. A method of preparing a nickel nanoparticle, the method comprising:
    forming an aqueous solution by mixing water and a solution containing a hydroxyl group;
    forming a mixed liquid by adding carboxylic acid to the aqueous solution at a ratio of 10 to 20 wt % with regard to the solution containing a hydroxyl group; and
    adding a nickel salt to the mixed liquid and stirring the mixed liquid.

2. The method of claim 1, further comprising, after the stirring of the mixed liquid, drying and heat treating the mixed liquid.

3. The method of claim 2, wherein the drying of the mixed liquid is performed under a nitrogen atmosphere at a temperature of 80 to 100° C.

4. The method of claim 2, wherein the heat treating is performed under an air atmosphere at a temperature of 180 to 250° C.

5. The method of claim 1, wherein in the forming of the aqueous solution, the solution containing a hydroxyl group is mixed at a ratio of 10 to 100 wt %, with regard to the water.

6. The method of claim 1, wherein in the forming of the aqueous solution, hydrogen peroxide ($H_2O_2$) and chlorine dioxide ($ClO_2$) are used for the solution containing a hydroxyl group.

* * * * *